(12) United States Patent
Blazer et al.

(10) Patent No.: US 10,830,085 B2
(45) Date of Patent: Nov. 10, 2020

(54) JET ENGINE ASSEMBLY AND METHOD FOR GENERATING ELECTRICITY

(71) Applicant: GE AVIATION SYSTEMS LLC, Grand Rapids, MI (US)

(72) Inventors: Rock O'Brien Blazer, Vandalia, OH (US); Joshua Martin Rhynard, Vandalia, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 14/896,038

(22) PCT Filed: Jun. 6, 2013

(86) PCT No.: PCT/US2013/044477
§ 371 (c)(1),
(2) Date: Dec. 4, 2015

(87) PCT Pub. No.: WO2014/196975
PCT Pub. Date: Dec. 11, 2014

(65) Prior Publication Data
US 2016/0130970 A1    May 12, 2016

(51) Int. Cl.
*F01D 15/10*      (2006.01)
*H02P 9/00*       (2006.01)
(Continued)

(52) U.S. Cl.
CPC ............ *F01D 15/10* (2013.01); *F02C 7/32* (2013.01); *F02K 3/00* (2013.01); *H02K 7/1823* (2013.01);
(Continued)

(58) Field of Classification Search
CPC . F01D 15/10; F02K 3/00; H02P 9/007; F05D 2220/7642; F05D 2220/768; Y02T 50/671
(Continued)

(56) References Cited

U.S. PATENT DOCUMENTS 3,697,765 A * 10/1972 Carini .................... F01D 1/026
                                                          290/54
3,902,073 A *  8/1975 Lafuze .................... H02P 9/08
                                                          290/46
(Continued)

FOREIGN PATENT DOCUMENTS

CN       1065364 A      10/1992
CN       1302475 A       7/2001
(Continued)

OTHER PUBLICATIONS

Unofficial English Translation of Chinese Office Action issued in connection with corresponding CN Application No. 201380077237.3 dated Aug. 29, 2016.
(Continued)

*Primary Examiner* — Tulsidas C Patel
*Assistant Examiner* — Joseph Ortega
(74) *Attorney, Agent, or Firm* — McGarry Bair, P.C.

(57) ABSTRACT

A jet engine assembly includes a jet engine having at least one spool and a generator. The generator comprising a rotor and a stator, with the rotor being operably coupled to the at least one spool, and an electronic commutator controlling the rotation of a magnetic field of the rotor such that the electric motor generates electricity. Also, a method of generating electricity from a generator having a stator and a rotor, the method comprising controlling a rotation of a magnetic field to generate electricity.

14 Claims, 6 Drawing Sheets

(51) Int. Cl.
*F02K 3/00* (2006.01)
*H02K 7/18* (2006.01)
*H02K 19/38* (2006.01)
*F02C 7/32* (2006.01)
*H02P 9/42* (2006.01)
*H02P 25/03* (2016.01)

(52) U.S. Cl.
CPC ............ *H02K 19/38* (2013.01); *H02P 9/007* (2013.01); *H02P 9/42* (2013.01); *H02P 25/03* (2016.02); *F05D 2220/768* (2013.01); *F05D 2220/7642* (2013.01); *F05D 2270/061* (2013.01); *H02K 2213/06* (2013.01); *Y02T 50/60* (2013.01)

(58) Field of Classification Search
USPC .......................................................... 290/52
See application file for complete search history.

(56) References Cited

U.S. PATENT DOCUMENTS

| | | | |
|---|---|---|---|
| 4,093,869 A | 6/1978 | Hoffmann et al. | |
| 4,625,160 A * | 11/1986 | Hucker | H02K 3/16 310/115 |
| 4,663,536 A * | 5/1987 | Roesel, Jr. | H02P 9/10 290/45 |
| 4,772,802 A | 9/1988 | Glennon et al. | |
| 5,262,693 A | 11/1993 | Holka | |
| 5,334,899 A * | 8/1994 | Skybyk | H02K 1/2793 310/114 |
| 5,493,200 A | 2/1996 | Rozman et al. | |
| 5,675,188 A | 10/1997 | Utamura | |
| 6,188,204 B1 | 2/2001 | Vithayathil et al. | |
| 6,388,409 B1 | 5/2002 | Weigold et al. | |
| 6,467,725 B1 * | 10/2002 | Coles | F01D 15/10 244/58 |
| 6,825,640 B1 | 11/2004 | Hill et al. | |
| 2003/0038483 A1 | 2/2003 | Klaar | |
| 2003/0042813 A1 * | 3/2003 | Morikaku | H02K 11/048 310/91 |
| 2003/0052565 A1 * | 3/2003 | Nickoladze | H02K 19/38 310/198 |
| 2003/0127927 A1 * | 7/2003 | Razzell | H02K 7/11 310/90.5 |
| 2004/0178640 A1 | 9/2004 | Sathoh et al. | |
| 2005/0147492 A1 * | 7/2005 | Mahoney | F02C 9/20 415/148 |
| 2006/0038405 A1 * | 2/2006 | Xu | H02K 19/16 290/31 |
| 2006/0038460 A1 * | 2/2006 | Bojiuc | H02K 3/28 310/198 |
| 2006/0087293 A1 | 4/2006 | Xu et al. | |
| 2006/0214427 A1 | 9/2006 | Xu et al. | |
| 2007/0102935 A1 * | 5/2007 | Sarlioglu | H02P 25/08 290/52 |
| 2008/0093850 A1 * | 4/2008 | Taneja | H02K 1/32 290/36 R |
| 2008/0150494 A1 | 6/2008 | Lemmers et al. | |
| 2008/0211237 A1 | 9/2008 | Berenge | |
| 2008/0298784 A1 * | 12/2008 | Kastner | G01P 3/44 388/811 |
| 2008/0303490 A1 * | 12/2008 | Xu | H02K 19/26 322/29 |
| 2009/0243417 A1 * | 10/2009 | Xu | H02K 7/20 310/184 |
| 2010/0083632 A1 * | 4/2010 | Foster | B64D 27/16 60/39.181 |
| 2010/0083669 A1 * | 4/2010 | Foster | B64D 31/04 60/802 |
| 2010/0107651 A1 * | 5/2010 | Hyde | F02C 6/18 60/784 |
| 2010/0126178 A1 * | 5/2010 | Hyde | F01D 15/10 60/767 |
| 2010/0200692 A1 * | 8/2010 | Goi | F16H 61/6649 244/58 |
| 2010/0314877 A1 | 12/2010 | Finney | |
| 2012/0225750 A1 * | 9/2012 | Allen | F01D 15/10 477/3 |
| 2013/0147192 A1 * | 6/2013 | Condon | F02C 7/268 290/34 |
| 2013/0174533 A1 * | 7/2013 | Ribarov | B64C 11/48 60/226.1 |
| 2013/0207395 A1 * | 8/2013 | Huang | H02K 9/19 290/46 |
| 2014/0245748 A1 * | 9/2014 | Anghel | F01D 15/10 60/783 |
| 2014/0338352 A1 * | 11/2014 | Edwards | F02C 3/113 60/774 |

FOREIGN PATENT DOCUMENTS

| | | |
|---|---|---|
| EP | 2523318 A2 | 11/2012 |
| JP | 50109333 A | 8/1975 |
| JP | 07-087797 A | 3/1995 |
| JP | 2003143899 A | 5/2003 |
| JP | 2008127013 A | 6/2008 |
| JP | 2008167643 A | 7/2008 |
| WO | 0176058 A1 | 10/2001 |
| WO | 2001076058 A1 | 10/2001 |

OTHER PUBLICATIONS

International Search Report and Written Opinion dated Mar. 25, 2014 which was issued in connection with PCT Patent Application No. PCT/US2013/044477 which was filed on Jun. 6, 2013.
Xiong-Jian, et al., "The Torque-speed Characteristic of a Star-connected Winding D.C.Motor With Electronic Commutator," Journal of Beijing University of Posts and Telecommunications No. 1, pp. 74-81 (Apr. 2, 1983) (Abstract).
Second Office Action and Search issued in connection with corresponding CN Application No. 201380077237.3 dated Mar. 24, 2017.
Unofficial English Translation of Japanese Search Report issued in connection with corresponding JP Application No. 2016518307 dated Jan. 26, 2017.
Unofficial English Translation of Japanese Office Action issued in connection with corresponding JP Application No. 2016518307 dated Feb. 7, 2017.
European Search Report and Opinion issued in connection with corresponding EP Application No. 13886487.1 dated Feb. 21, 2017.
Canadian Examination Search Report cited in related Canadian Patent Application No. 2913526, 4 pages, dated Jan. 22, 2019, Quebec, Canada.
Indian Office Action dated Apr. 1, 2019, in related Indian Patent Application No. 7431/CHENP/2015, 7 pages.

* cited by examiner

JET ENGINE ASSEMBLY AND METHOD FOR GENERATING ELECTRICITY

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction. A triple spool gas turbine engine includes a third, intermediate pressure (IP) spool.

Gas turbine engines also use the mechanical power of one or more spools to power a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy needed to power accessories.

It is known to use constant speed generators and variable frequency generators (VFG) for extracting power from the pressure spools of gas turbine engines. The voltage and frequency of the synchronous, 3 phase generator is a function of the spool speed when directly driven by the spool. Since the speed of each spool may fluctuate during operation of the engine, the voltage and frequency of the generated electricity may also fluctuate. These electricity fluctuations create a problem for the electrical system of the aircraft, which requires a constant voltage and frequency. Thus, to address this problem, a gear box is used, wherein the gear box mechanically couples the spool to the generator, wherein the gear box is configured to drive the generator at a constant speed that will output the desired voltage and frequency, regardless of the spool speed. For example, a gearbox may be employed for a HP spool wherein the gearbox ratio of speed input to speed output reduces the mechanical speed of the spool to within the desired operational speed of the generator. Typically, a normal speed for a constant frequency generator (CFG) is a four pole machine at 12,000 RPMs to produce 400 Hz output for an aircraft system.

BRIEF DESCRIPTION OF THE INVENTION

In one aspect, a jet engine assembly includes a jet engine having at least one spool and a generator. The generator further includes a synchronous electric motor comprising a rotor and a stator, with the rotor being operably coupled to the at least one spool such that speed of the rotor varies with the speed of the spool, and an electronic commutator controlling the rotation of a magnetic field of the rotor relative to the rotation of the rotor such that the synchronous electric motor generates electricity at a predetermined frequency.

In another aspect, a method of generating electricity having a predetermined frequency from a generator having a stator and a rotor, which is rotated by a variable speed engine, the method comprising controlling a rotation of a magnetic field of the rotor relative to the rotation of the rotor to generate electricity at a predetermined frequency.

DESCRIPTION OF EMBODIMENTS OF THE INVENTION

While the invention may be implemented in any environment using a generator for generating electricity, it is currently contemplated to be implemented in a jet engine environment, where the generator is typically referred to as an electric motor or electric machine. Thus, a brief summary of the contemplated environment should aid in a more complete understanding. A gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region to increase the velocity of the exhausted gases, and thereby increasing thrust.

Figure 1:
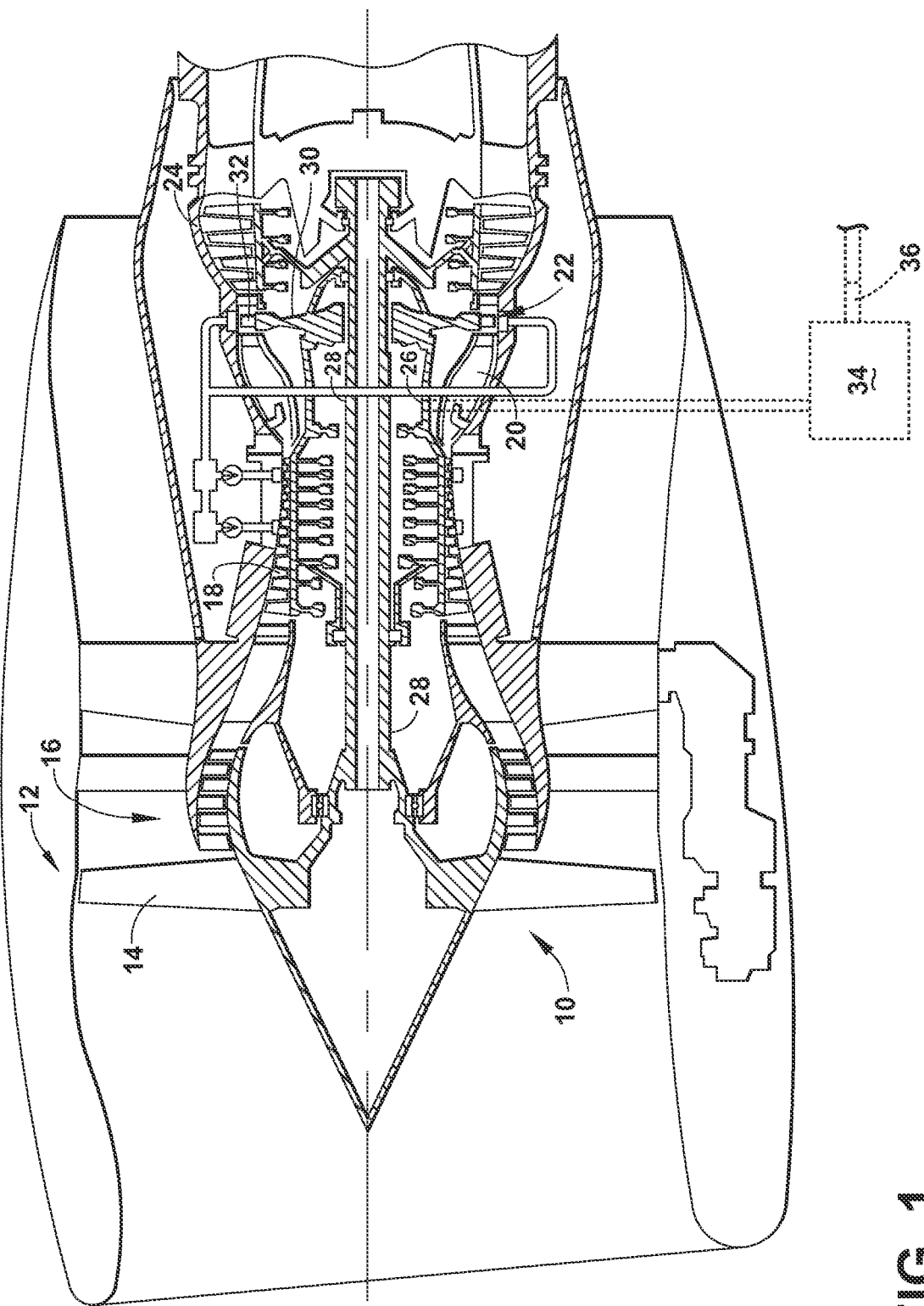
FIG. 1 is a schematic cross-sectional diagram of a gas turbine engine for an aircraft in accordance with an embodiment of the invention.

FIG. 1 is a schematic cross-sectional diagram of a gas turbine engine 10 for an aircraft as an example of the environment where embodiments of the invention will prove advantageous. Engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. A HP shaft or spool 26 drivingly connects HP turbine 22 to HP compressor 18 and a LP shaft or spool 28 drivingly connects LP turbine 24 to LP compressor 16 and fan 14. HP turbine 22 includes an HP turbine rotor 30 having turbine blades 32 mounted at a periphery of rotor 30.

The engine further comprises a synchronous generator assembly 34 mounted on or within a gas turbine aircraft engine. The generator assembly 34 may be mounted on the outside of either the air intake region of the gas turbine engine containing the fan or on the core near the high pressure compression region. At least one voltage output is provided on the exterior of the generator assembly 34 to provide for the transfer of electrical power to and from the generator 34. This power connection, as illustrated, is transmitted by an electrical power cable 36 and may provide for at least one of alternating current, multi-phase, and constant voltage output, with a ground reference from the generator assembly 34. The generator assembly 34 may additionally generate electrical power at predetermined frequency, such as a constant frequency or a variable frequency within predetermined limits. One example of generated electricity comprises three-phase 115V AC at a predetermined 400 Hz. Alternate generated phases, currents, and voltages are envisioned.

Figure 2:
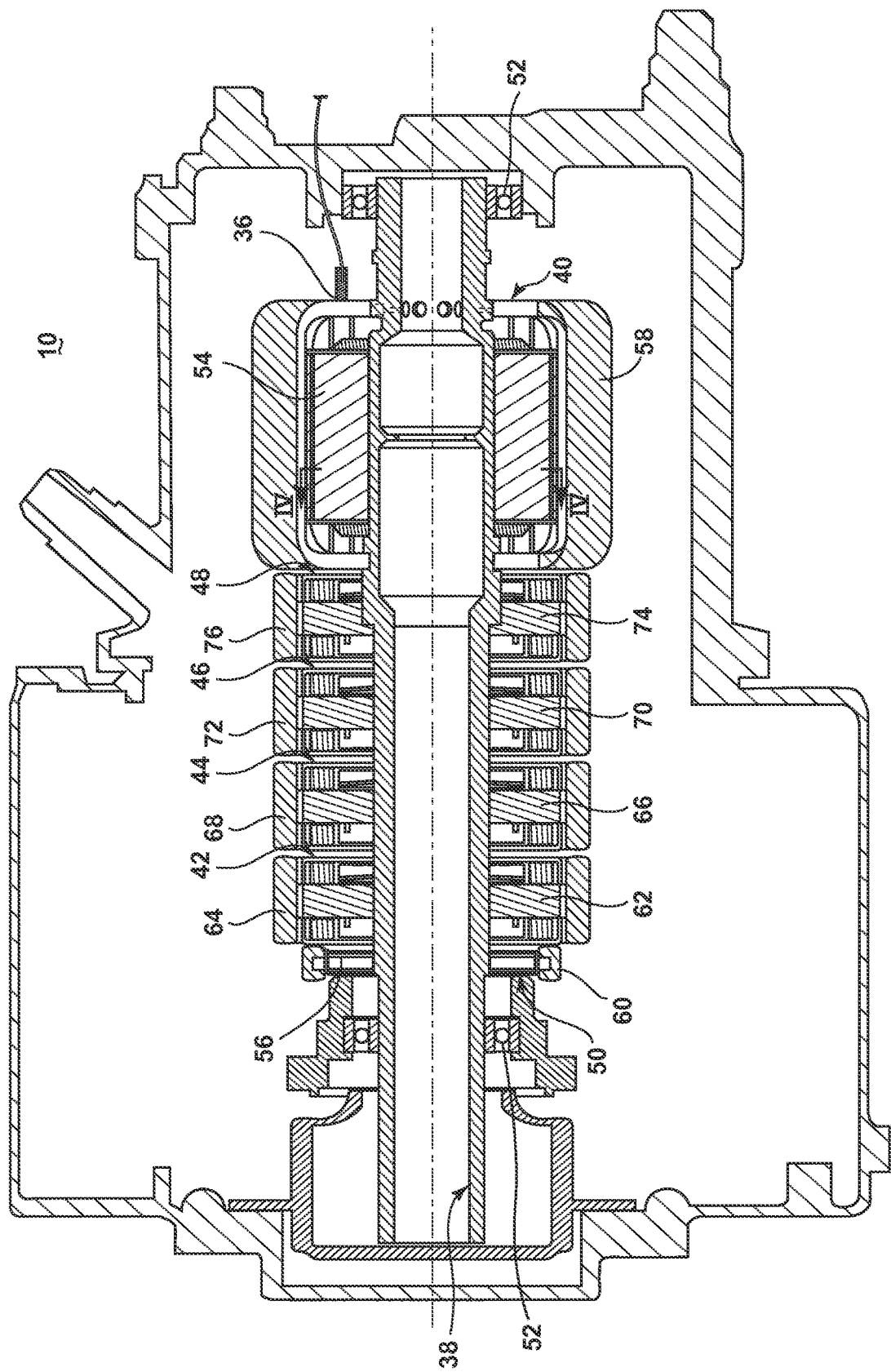
FIG. 2 is a cross-sectional diagram of a generator assembly for an aircraft in accordance with an embodiment of the invention.

Referring to FIG. 2, the generator assembly 34 comprises a rotatable shaft 38, synchronous main machine 40, four exciters 42, 44, 46, 48 and a permanent magnet generator (PMG) 50. The rotatable shaft 38 is supported by spaced bearings 52. Each of the main machine 40 and the PMG 50 has a respective rotor 54, 56, and a corresponding respective stator 58, 60. The first exciter 42 has a first exciter rotor 62 and a corresponding first exciter stator 64. The second exciter 44 has a second exciter rotor 66 and a corresponding second exciter stator 68. The third exciter 46 has a third exciter rotor 70 and a corresponding third exciter stator 72. The fourth exciter 48 has a fourth exciter rotor 74 and a corresponding fourth exciter stator 76. The rotors 54, 56, 62, 66, 70, 74 are mounted to the rotatable shaft 38 for rotation relative to the stators 58, 60, 64, 68, 72, 76 which are rotationally fixed within the generator assembly 34. The stators 58, 60 64, 68, 72, 76 may be mounted to any suitable part of housing portion of the generator assembly 34.

In the illustrated embodiment, the main machine 40 is located in the rear of the generator assembly 34 and the PMG 50 is positioned in the front of the generator assembly 34. The exciters 42, 44, 46, 48 are positioned in the generator assembly 34 between the main machine 40 and the PMG 50. Other positions of the main machine 40, exciters 42, 44, 46, 48, and PMG 50 are envisioned and the patentable scope should not be limited by any single embodiment. For example, alternate positioning is envisioned wherein exciters 42, 44, 46, 48 are located on both sides of the main machine 40.

Figure 3:
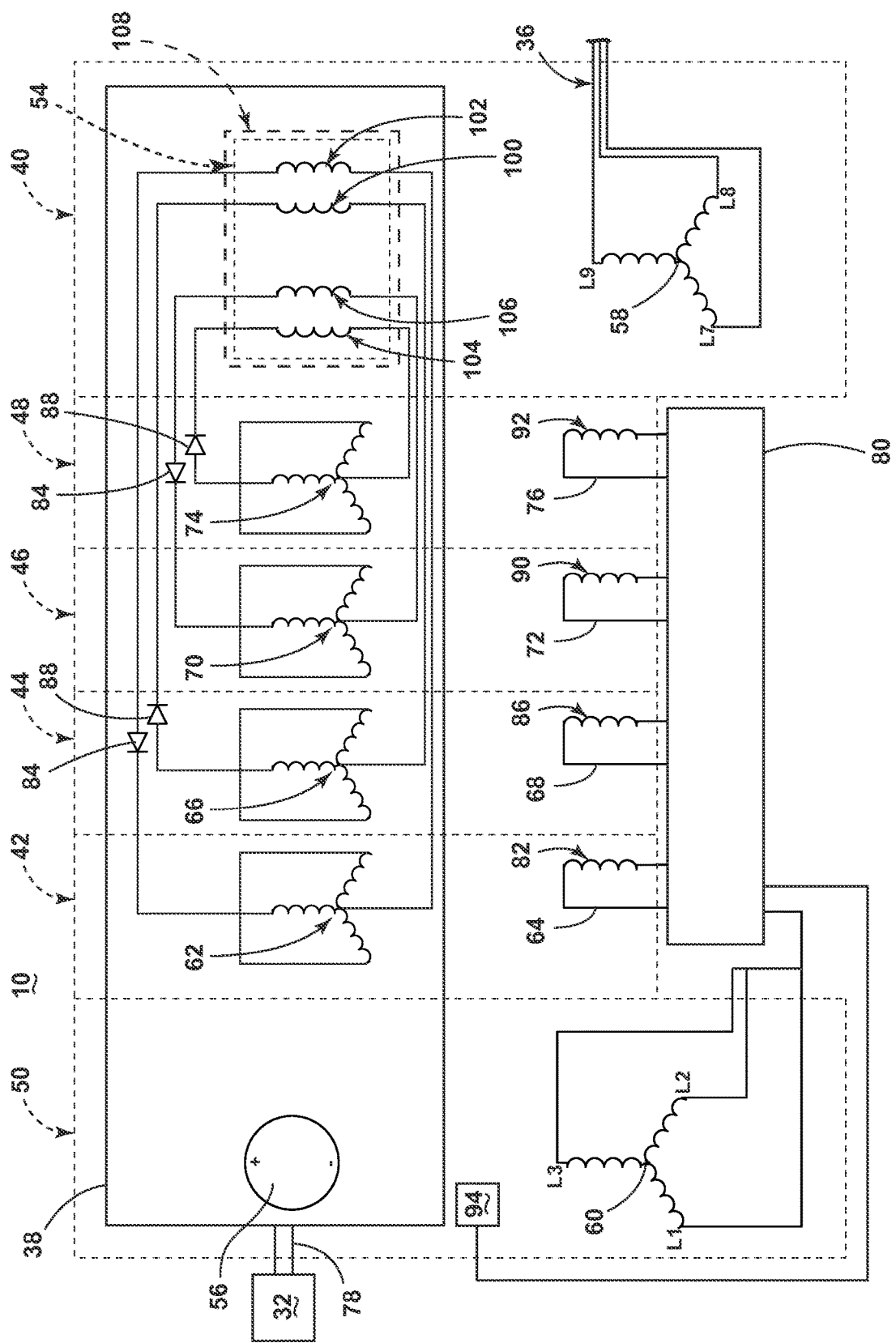
FIG. 3 is a schematic view of a generator assembly rotatable shaft in accordance with an embodiment of the invention.

FIG. 3 illustrates a schematic view of the generator assembly 34. The rotatable shaft 38 is coupled by mechanical coupling 78 with at least one spool of the engine 10, shown as the HP spool 26. In this sense, the HP spool 26 provides a direct source of axial rotation from the engine 10 such that the speed of the rotatable shaft 38, and thus the rotors 54, 56, 62, 66, 70, 74, vary with the speed of the HP spool 26.

The PMG rotor 56 is shown having a permanent magnet with at least two poles. The PMG stator 60 is electromagnetically aligned with the PMG rotor 56 and comprises windings arranged to provide for three phase output along leads L1, L2, L3 which are supplied to a common supply line to the exciter stators 64, 68, 72, 76, via a common electronic commutator 80. The PMG stator 60 further comprises a rotor speed sensor 94 configured to provide a signal indicative of the rotational speed of the rotating shaft 38 to the electronic commutator 80. The rotor speed sensor 94 is shown adjacent to the PMG rotor 56, and may operate my sensing the change in polarity of the permanent magnet to generate a rotational speed signal. Alternate sensors, such as tachometers, and methods of sensing rotational speed are envisioned. Additionally, it is envisioned the rotor speed sensor 94 may be integrated with the PMG rotor 56.

The first exciter stator 64 comprises a first exciter field winding 82 extending of the electronic commutator 80 and electromagnetically aligned with the first exciter rotor 62. The first exciter rotor 62 comprises windings arranged to provide for three phase output along leads which, as illustrated, are supplied to a reverse-biased diode rectifier 84.

The second exciter stator 68 comprises a second exciter field winding 86 extending of the electronic commutator 80 and electromagnetically aligned with the second exciter rotor 66. The second exciter rotor 66 comprises windings arranged to provide for three phase output along leads which, as illustrated, are supplied to a forward-biased diode rectifier 88.

The third exciter stator 72 comprises a third exciter field winding 90 extending of the electronic commutator 80 and electromagnetically aligned with the third exciter rotor 70. The third exciter rotor 70 comprises windings arranged to provide for three phase output along leads which, as illustrated, are supplied to the reverse-biased diode rectifier 84.

The fourth exciter stator 76 comprises a fourth exciter field winding 92 extending of the electronic commutator 80 and electromagnetically aligned with the fourth exciter rotor 74. The fourth exciter rotor 74 comprises windings arranged to provide for three phase output along leads which, as illustrated, are supplied to the reverse-biased diode rectifier 88.

The electronic commutator 80 is enabled to electronically switch current from the leads L1, L2, L3 to one or more set of exciter field windings 82, 86, 90, 92 based on the rotor speed sensor 94 signal.

The main machine rotor 54 comprises a first, second, third, and fourth set of main machine rotor field windings 100, 102, 104, 106 arranged about the rotor 54, which, when energized, are configured to produce a magnetic field 108 on the rotor 54. As illustrated, the first and second rotor field windings 100, 102 are electrically coupled with the respective outputs of the second and first exciter rotors 66, 62. Additionally as illustrated, the third and fourth rotor field windings 104, 106 are electrically coupled with the respective outputs of the fourth and third exciter rotors 74, 70. Each set of rotor field windings 100, 102, 104, 106 is thus energizably dependent on the energizing of their respectively coupled exciter field windings 86, 82, 92, 90. The main machine stator 58 has leads L7, L8, L9 electromagnetically aligned with the main machine rotor 54 and arranged so that each lead L7, L8, L9 may transmit a single phase current to the electrical power cable 36.

Figure 4:
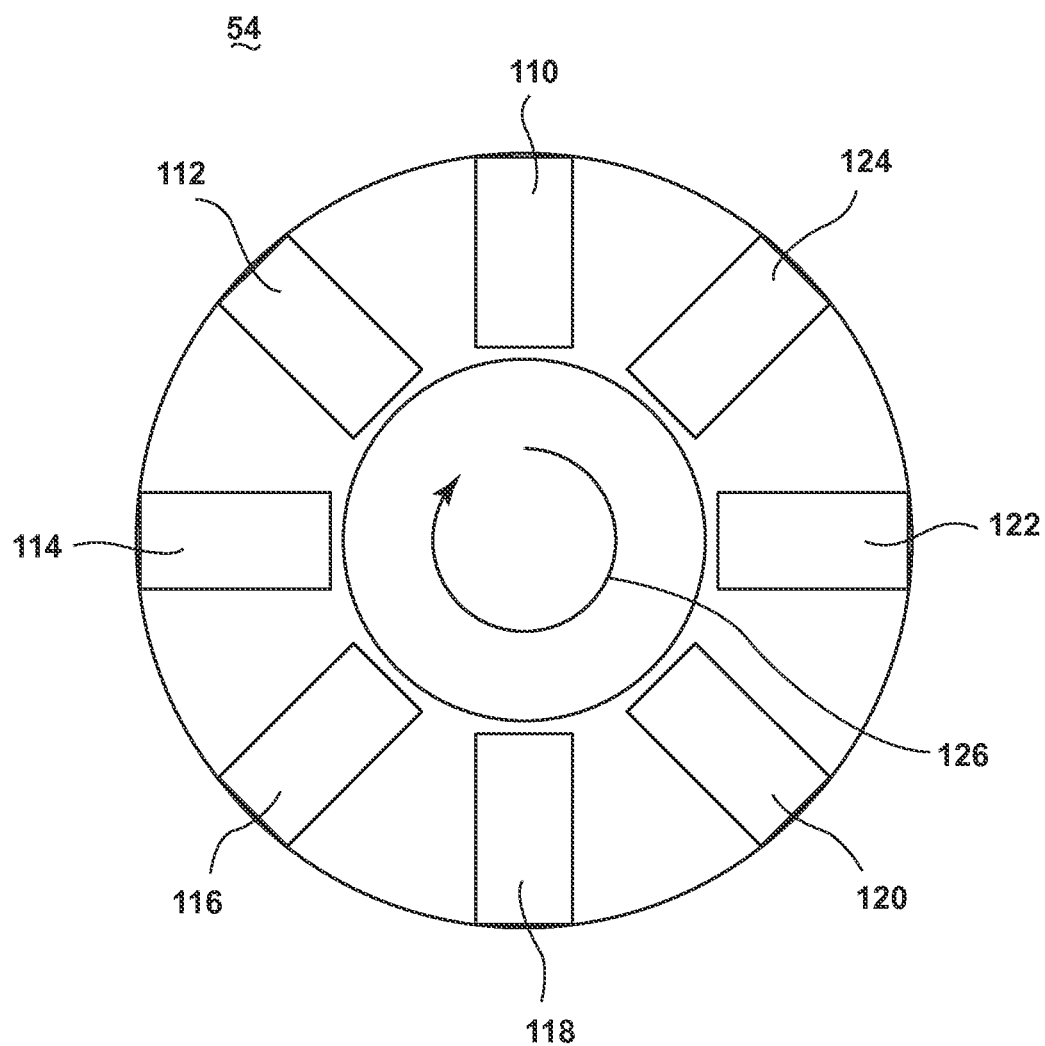
FIG. 4 is a partial sectional view taken along line 4-4 of FIG. 2, showing the main machine rotor in accordance with an embodiment of the invention.

FIG. 4 illustrates a schematic sectional view taken along line IV-IV of FIG. 1 illustrating the rotor with four pole pairs and the rotor's direction of rotation 126. As shown, the main machine rotor 54 comprises a first, second, third, fourth, fifth, sixth, seventh, and eighth pole 110, 112, 114, 116, 118, 120, 122, 124, radially spaced and aligned about the rotatable shaft 38. One example of how the poles 110, 112, 114, 116, 118, 120, 122, 124 may be configured to electrically couple with the first, second, third, and fourth rotor field windings 100, 102, 104, 106 is as follows: the first rotor field winding 100 is wound about with the first, third, fifth, and seventh poles 110, 114, 118, 122 such that the first and fifth poles 110, 118 are always magnetically opposing the third and seventh poles 114, 122; the second rotor field winding is wound about the same magnetically opposing poles 110, 114, 118, 122 as the first rotor field winding 100, but in the opposite direction; the third rotor field winding 104 is wound about the second, fourth, sixth, and eighth poles 112, 116, 120, 124 such that the second and sixth poles 112, 120 are always magnetically opposing the fourth and eighth poles 116, 124; and the fourth rotor field winding 106 is wound about the same magnetically opposing poles 112, 116, 120, 124 as the third rotor field winding 104, but in the opposite direction.

The commutation of the main machine 40 may be controlled by the energizing of the exciters 42, 44, 46, 48 to control the direction and speed of the magnetic field 108 relative to the axis of rotation. In this manner, the magnetic field 108 may be rotated faster or slower as desired relative to the rotational speed of the rotatable shaft 38. To effect this commutation, an energizing of the first exciter field winding 82 generates a resulting three-phase output on the first exciter rotor 62 which is rectified by the reverse-biased rectifier and transmitted to the first, third, fifth, and seventh poles 110, 114, 118, 122 such that the first and fifth poles 110, 118 are magnetically north and the third and seventh poles 114, 122 are magnetically south. Additionally, energizing the second exciter field winding 86 generates a resulting three-phase output on the second exciter rotor 66 which is rectified by the forward-biased rectifier and transmitted to the first, third, fifth, and seventh poles 110, 114, 118, 122 such that the first and fifth poles 110, 118 are magnetically south and the third and seventh poles 114, 122 are magnetically north. Energizing the third exciter field winding 90 generates a resulting three-phase output on the third exciter rotor 70 which is rectified by the reverse-biased rectifier and transmitted to the second, fourth, sixth, and eighth poles 112, 116, 120, 124 such that the second and sixth poles 112, 120 are magnetically north and the fourth and eighth poles 116, 124 are magnetically south. Energizing the fourth exciter field winding 92 generates a resulting three-phase output on the fourth exciter rotor 74 which is rectified by the forward-biased rectifier and transmitted to the second, fourth, sixth, and eighth poles 112, 116, 120, 124 such that the second and sixth poles 112, 120 are magnetically south and the fourth and eighth poles 116, 124 are magnetically north.

Figure 5:
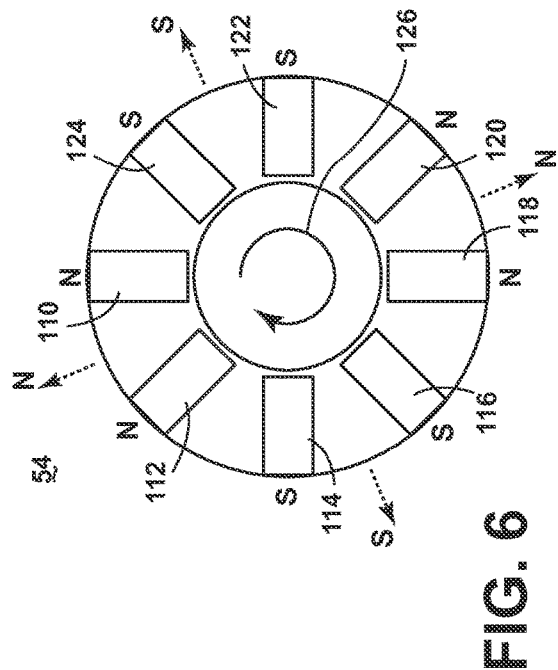
FIG. 5 is a schematic view of the main machine rotor, with the poles energized in the first cycle of a sequence, in accordance with an embodiment of the invention.
Figure 6:
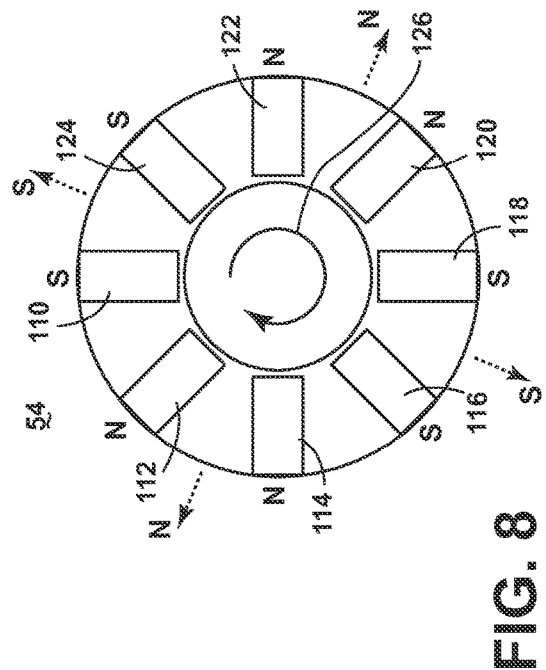
FIG. 6 is a schematic view of the main machine rotor, with the poles energized in the second cycle of a sequence, in accordance with an embodiment of the invention.
Figure 7:
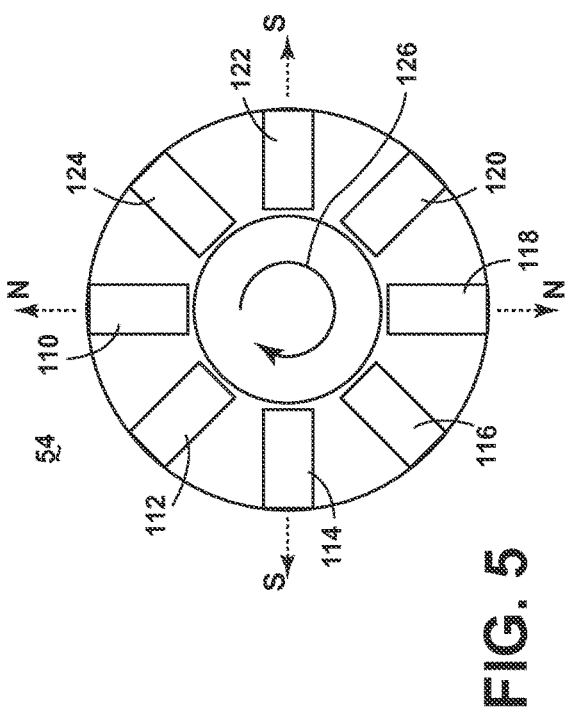
FIG. 7 is a schematic view of the main machine rotor, with the poles energized in the third cycle of a sequence, in accordance with an embodiment of the invention.
Figure 8:
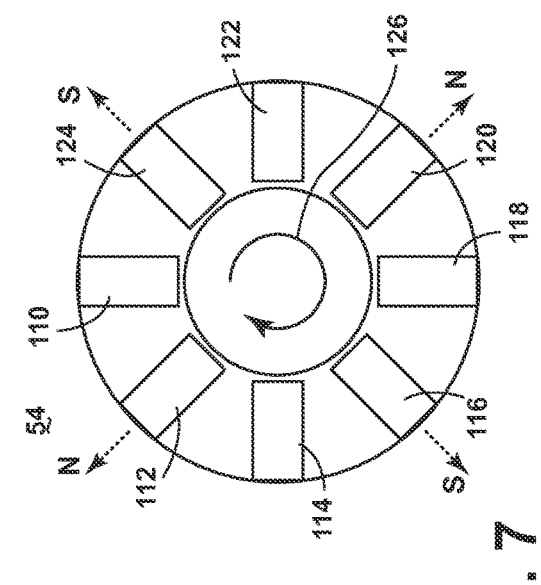
FIG. 8 is a schematic view of the main machine rotor, with the poles energized in the fourth cycle of a sequence, in accordance with an embodiment of the invention.
Figure 9:
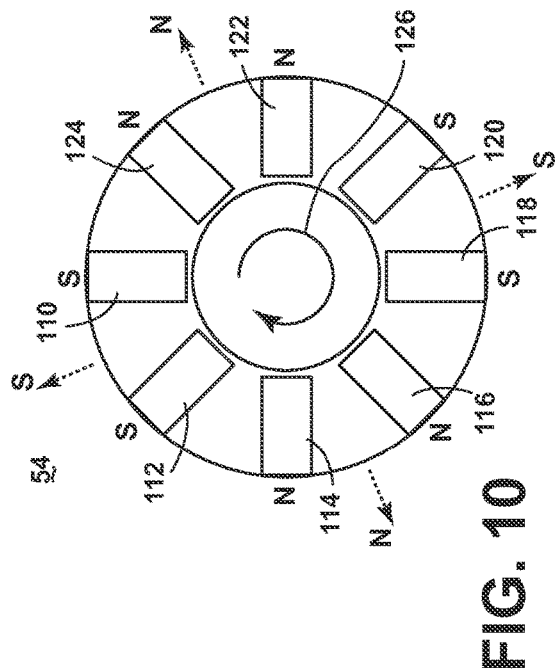
FIG. 9 is a schematic view of the main machine rotor, with the poles energized in the fifth cycle of a sequence, in accordance with an embodiment of the invention.
Figure 10:
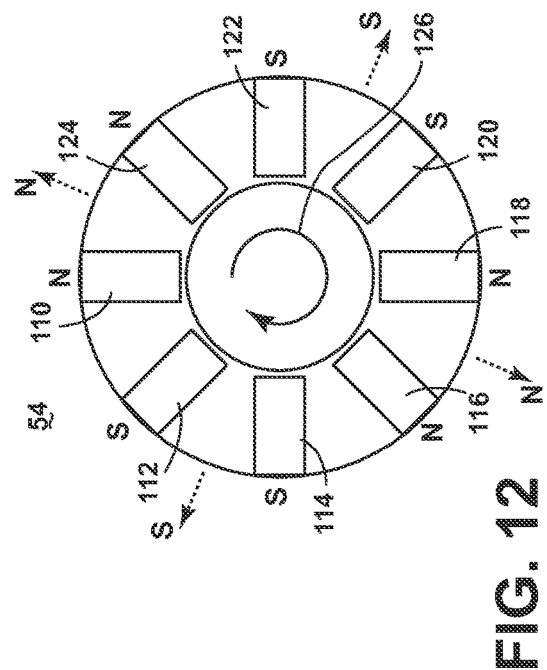
FIG. 10 is a schematic view of the main machine rotor, with the poles energized in the sixth cycle of a sequence, in accordance with an embodiment of the invention.
Figure 11:
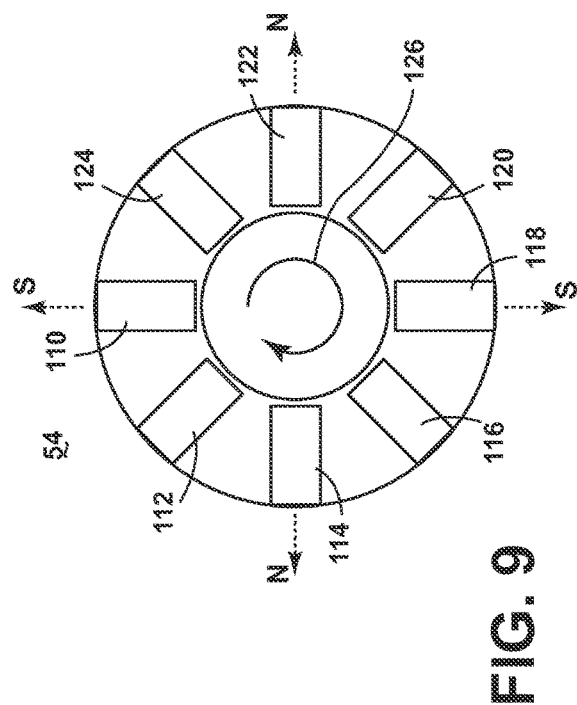
FIG. 11 is a schematic view of the main machine rotor, with the poles energized in the seventh cycle of a sequence, in accordance with an embodiment of the invention.
Figure 12:
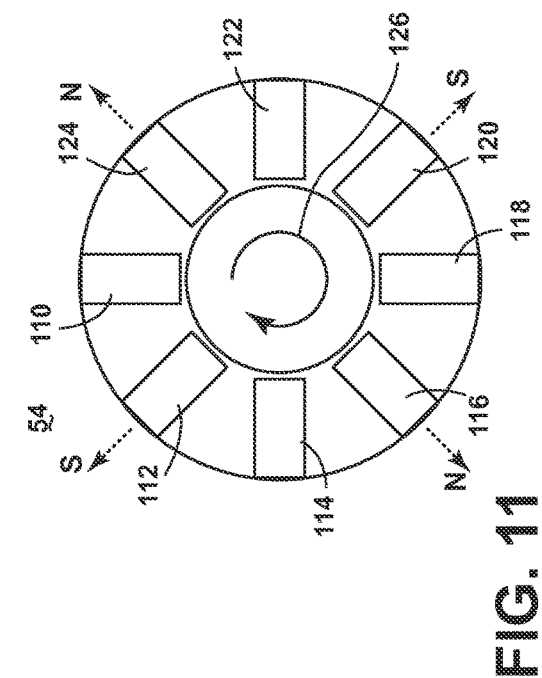
FIG. 12 is a schematic view of the main machine rotor, with the poles energized in the eighth cycle of a sequence, in accordance with an embodiment of the invention.

The electronic commutator 80 selectively energizes the first, second, third, and fourth exciter field windings 82, 86, 90, 92 to operably control the magnetic direction of the poles 110, 112, 114, 116, 118, 120, 122, 124, and thus, the magnetic field 108 of the main machine rotor 54. By alternating the energized exciter field windings 82, 86, 90, 92 in a particular sequence of energizing, the electronic commutator 80 can effectively rotate the magnetic field 108 relative the main machine rotor 54, independent of the rotor's 54 direction of rotation 126. For example, in an eight cycle switching operation, the electronic commutator 80 can rotate a magnetic field 108 counter-clockwise (CCW), opposing the rotor's clockwise (CW) direction of rotation 126, as illustrated by FIG. 4, by using the following sequence: energizing the first exciter field winding 82 (as shown in FIG. 5); energizing the first and third exciter field windings 82, 90 (as shown in FIG. 6); energizing the third exciter field winding 90 (as shown in FIG. 7); energizing the second and third exciter field windings 86, 90 (as shown in FIG. 8); energizing the second exciter field winding 86 (as shown in FIG. 9); energizing the second and fourth exciter field windings 86, 92 (as shown in FIG. 10); energizing the fourth exciter field winding 92 (as shown in FIG. 11); energizing the first and fourth exciter field windings 82, 92 (as shown in FIG. 12). When two exciter field windings are energized at the same time, for instance, producing two magnetically north poles next to each other, the "effective north" (illustrated in FIGS. 5-12 as dotted arrows) of the main machine rotor 54 will be angularly between the two north poles.

Since the first and second exciter fields 82, 86 are oppositely wound about the same poles 110, 114, 118, 122, the electronic commutator will never energize these two field windings 82, 86 simultaneously. Similarly, since the third and fourth field windings 90, 92 are oppositely wound about the same poles 112, 116, 120, 124, the electronic commutator will never energize these two field windings 90, 92 simultaneously. Additionally, while the above example sequence rotates the magnetic field 108 of the main machine rotor 54 CCW, a plurality of alternate sequences are envisioned which, for example, rotate the magnetic field 108 CW, or eliminate the energizing of one or more exciter field windings 82, 86, 90, 92 during a sequence. Furthermore, the electric commutator 80 is configured to change from one sequence to another sequence during operation of the generator assembly 34 without interrupting generator 34 operation and without breaking the output power supply of the generator 34. The electric commutator 80 is also able to dynamically increase or decrease the speed of the operation of the sequence, or change the direction of sequencing, as needed.

In operation, with the gas turbine engine 10 running, the HP turbine 22 rotates the HP spool 26. The rotating HP spool 26 transmits mechanical power from the HP spool 26 to the rotatable shaft 38 of the generator assembly 34. The rotating PMG rotor 56 generates a three phase output in the leads L1, L2, L3 of PMG stator 60, supplying power to the electronic commutator 80. The electronic commutator 80 receives a rotor speed signal from the rotor speed sensor 94 and selectively energizes the first, second, third, and fourth exciter field windings 82, 86, 90, 92 in response to the rotor speed signal.

The rotation of the exciter rotors 62, 64, 66, 68 generates a three phase power, which is converted to DC power by the rectifiers 84, 88. The DC power is supplied to the rotor field windings 100, 102, 104, 106. The main machine rotor 54 rotates relative to the main machine stator 58, generating three phase power output at leads L7, L8, L9 to supply electrical power cable 36, and thus to the aircraft. Depending on the type of electrical loads drawing power, the power generated by the generator assembly 34 may undergo further processing before being used by the loads.

The electronic commutator's 80 selective energizing of the exciter field windings 82, 86, 90, 92 generates output electricity at a predetermined frequency independent of the speed of the rotatable shaft 38. For instance, if a rotatable shaft 38 is rotating in a CW direction, at a rotational speed above the operable speed needed to generate the desired power frequency, the electronic commutator 80 senses the rotor speed, using the rotor speed sensor 94, and sequences the magnetic field 108 of the main machine rotor 54, via the exciter field windings 82, 86, 90, 92, in a CCW direction, at a rotational speed calculated to decrease the rotating magnetic field 108 to the operable speed, relative to the main machine stator 58. Stated another way, the rotational speed of the magnetic field 108 reduces the rotational speed of the main machine rotor 54 to bring the "effective" rotation of the magnetic field 108 to the operable speed needed to generate the desired power, relative to the main machine stator 58.

In this embodiment, or alternate embodiments, the electronic commutator 80 may also control the rotation of the magnetic field 108 to account for a rotatable shaft 38 that is rotating at a variable speed below the operable speed needed to generate the desired, constant power frequency. For instance, the electronic commutator 80 may compensate for a rotatable shaft 38 rotating too slowly in a CW direction by sensing the rotor speed, using the rotor speed sensor 94, and sequences the magnetic field 108 of the main machine rotor 54 in a CW direction, at a rotational speed calculated to increase the effective rotating magnetic field 108 to the operable speed, relative to the main machine stator 58. Stated another way, the rotational speed of the magnetic field 108 increases the rotational speed of the main machine rotor 54 to bring the "effective" rotation of the magnetic field 108 to the operable speed needed to generate the desired power, relative to the main machine stator 58.

Additionally, it is envisioned that the electronic commutator 80 may change the direction of sequencing, as needed, to produce a constant effective rotation of the magnetic field 108. The operation of the electronic commutator 80 may also control the rotational speed of the magnetic field 108 of the main machine rotor 54 to maintain a constant or predetermined difference in the relative speed between the rotational speeds of the magnetic field 108 and the main machine rotor 54. Thus the power generated by the generator assembly 34 remains constant regardless of the speed of the engine 10 operation.

Many other possible embodiments and configurations in addition to that shown in the above figures are contemplated by the present disclosure. For example, although the generator assembly 34 is shown directly coupled with the HP spool 26, it is envisioned that any generator/spool combination may function similarly, e.g., the generator assembly 34 may be coupled with the LP spool 28, and so on. Moreover, multiple generator assemblies 34 could also be implemented on an engine 10 having more than one generator or more than two spools, such as a 3-spool/3-generator engine having an intermediate pressure spool in addition to the HP and LP spools 26, 28. In these alternate spool embodiments, the variable speed of the spool in a variable speed engine may be able to generate a constant power output.

Alternatively, embodiments of the current invention may additionally include the use of an intermediary speed exchanger between the spool and mechanical coupling 78 to the rotatable shaft 38. For instance, an accessory gearbox or constant speed device may have an input mechanically coupled to the LP spool 28 and an output mechanically coupled to the rotatable shaft 38, wherein the accessory gearbox alters the source of axial rotational speed. The intermediary speed exchanger may be coupled between any of the above mentioned spools, and may increase, decrease, or make constant the source of axial rotational speed, which will be acted on by the electronic commutator 80, as described. Within the intermediary speed exchanger, rotational power may also be transferred to other engine accessories.

Furthermore, the generator assemblies 34 do not need to reside within the same engine 10. For example, three generator assemblies 34 may be coupled to HP or LP spools 26, 28 in two different engines 10.

The embodiments disclosed herein provide a PMG RAT system with inside out construction. One advantage that may be realized in the above embodiments is that commonly-designed generators that are readily available for extracting power from any available spools of the jet engine, thereby saving significant cost in separate development and sourcing for generators that extract power from individual operating spools. Additionally, when designing aircraft power generation components, important factors to address are reliability under multiple operating conditions. The above embodiments are able to provide no-break power generation regardless of the operating speeds of the mechanical spools they are driven by. Furthermore, the above described generation assembly has a decreased number of parts as the system because intermediary speed exchange devices are not required, and thus, the embodiments will be able to provide regulated power output with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A jet engine assembly comprising:
 a jet engine having at least one spool;
 a generator comprising:
  a synchronous electric machine comprising a rotor and a stator, with the rotor being operably coupled to the at least one spool such that a rotational speed of the rotor varies with the speed of the spool, the rotor having a plurality of main machine rotor field windings defining a plurality of main machine rotor poles;
  an exciter having an exciter stator and an exciter rotor, which rotates with the rotor of the synchronous machine, the exciter stator and rotor having a plurality of exciter rotor field windings corresponding to the plurality of main machine rotor field windings wherein the plurality of exciter rotor field windings are electrically coupled to a respective subset of the plurality of main machine rotor field windings of the synchronous electric machine rotor through rectifiers; and
  an electronically commutating device coupled to a rotor speed sensor that receives a rotor speed signal from the rotor speed sensor and selectively energizing the plurality of main machine rotor field windings, by way of selectively energizing the plurality of exciter rotor field windings, to control a magnetic direction of each of the plurality of main machine rotor poles based on the rotor speed signal such that, when the generator is generating electricity at a generator output, the energizing the plurality of main machine rotor field windings generating a magnetic field rotating relative to the rotor, and the rotation of the magnetic field generates electricity at a predetermined frequency.

2. The jet engine assembly of claim 1 wherein the predetermined frequency comprises a constant frequency.

3. The jet engine assembly of claim 2 wherein the generated electricity comprises at least one of alternating current, multi-phase, constant voltage, and three-phase 115 VAC at 400 Hz.

4. The jet engine assembly of claim 1 further comprising at least one of an accessory gearbox directly coupling the rotor to the at least one spool, and the rotor operably coupled to the at least one spool without a constant speed device.

5. The jet engine assembly of claim 1 wherein the at least one spool comprises at least one of a low pressure spool and a high pressure spool.

6. The jet engine assembly of claim 1 wherein the generator further comprises a permanent magnet generator (PMG) having a PMG stator and a PMG rotor, which rotates with the rotor of a synchronous motor, and the PMG rotor comprises a first speed sensor.

7. The jet engine assembly of claim 1 wherein controlling the rotation of the magnetic field comprises controlling at least one of a rotational direction and a rotational speed such that the difference in the rotation of the magnetic field and the rotation of the rotor is constant.

8. A jet engine assembly comprising:
a jet engine having at least one spool;
a generator comprising:
  a synchronous electric machine comprising a rotor and a stator, with the rotor being operably coupled to the at least one spool such that the speed of the rotor varies with the speed of the spool, the rotor having a plurality of main machine rotor field windings defining a plurality of main machine rotor poles and generating electricity at a generator output;
  an exciter having an exciter stator and an exciter rotor, which rotates with the rotor of the synchronous machine, the exciter stator and rotor having a plurality of exciter rotor field windings corresponding to the plurality of main machine rotor field windings wherein the plurality of exciter rotor field windings are electrically coupled to a respective subset of the plurality of main machine rotor field windings of the synchronous electric machine rotor through rectifiers; and
  an electronically commutating device coupled to a rotor speed sensor that receives a rotor speed signal from the rotor speed sensor and selectively energizing the plurality of main machine rotor field windings to control a magnetic direction of each of the plurality of main machine rotor poles based on the rotor speed signal such that the energizing the plurality of main machine rotor field windings generating a magnetic field rotating relative to the rotor, and wherein an effective rotation of the magnetic field relative to the stator generates electricity at a predetermined frequency independent of the speed of the rotor.

9. A method of generating electricity having a predetermined frequency from a generator having a stator and a rotor, which is rotated by a variable speed prime mover, the method comprising using an electronically commutating device coupled to a rotor speed sensor that receives a rotor speed signal from the rotor speed sensor and selectively energizes a set of main machine rotor field windings based on the rotor speed signal to dynamically generate a set of magnetic fields thereby controlling a rotation of a magnetic field of the rotor relative to the rotation of the rotor to generate electricity at the predetermined frequency.

10. The method of claim 9 wherein the predetermined frequency comprises a constant frequency.

11. The method of claim 10 wherein controlling the rotation of the magnetic field comprises controlling at least one of the rotational speed and rotational direction of the magnetic field.

12. The method of claim 11 wherein controlling the rotation of the magnetic field comprises at least one of controlling the rotational speed of the magnetic field to maintain a constant difference in the relative speed between the rotational speeds of the magnetic field and the rotor, and controlling the rotational speed of the magnetic field relative to the rotational speed of the rotor to maintain a predetermined difference.

13. The method of claim 12 wherein the predetermined difference is constant.

14. The method of claim 9 wherein the generated electricity comprises at least one of alternating current, multi-phase, constant voltage, and three-phase 115 VAC at 400 Hz.

* * * * *